April 11, 1967 J. G. SMITH ETAL 3,313,602
METHOD FOR MAKING METAL OXIDE MICROSPHERES
Filed Sept. 23, 1964
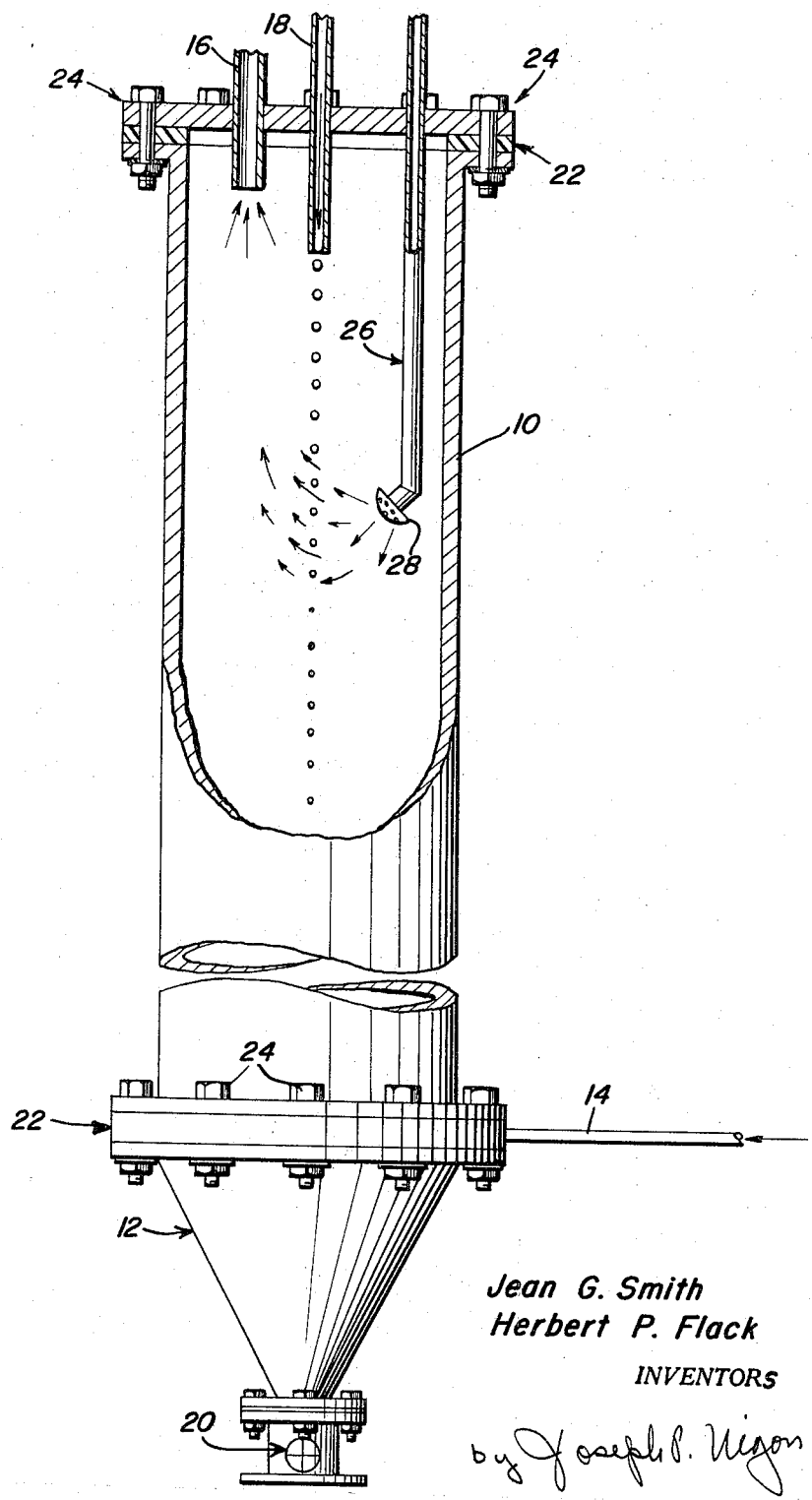
Jean G. Smith
Herbert P. Flack
INVENTORS
by Joseph P. Nigon

United States Patent Office 3,313,602
Patented Apr. 11, 1967

3,313,602
METHOD FOR MAKING METAL OXIDE MICROSPHERES
Jean G. Smith, Baltimore, and Herbert P. Flack, Ellicott City, Md., assignors to W. R. Grace & Co., New York, N.Y., a corporation of Connecticut
Filed Sept. 23, 1964, Ser. No. 398,670
5 Claims. (Cl. 23—345)

This invention relates to a process and apparatus for forming spherical particles from colloidal residues by drying aquasols. In one particular embodiment it relates to preparing highly regular spheres of nuclear materials such as urania, other actinide oxides, zirconium oxide, systems containing actinide oxide, and actinide oxide solid solutions.

In summary, the process of this invention comprises introducing a metal oxide aquasol into a dehydrating solvent for extraction of water from the aquasol and removing the dehydrated dense spherical metal oxide particles formed from the dehydrating solvent with the improvement of pretreating the metal oxide aquasol with hydrogen peroxide and/or injecting water into the body of dehydrating solvent in the path of the movement of the aquasol particles.

In summary, the apparatus of this invention comprises an extraction column having a dehydration solvent inlet and outlet, a sol injection means at the top of the column having an inner diameter of from about 0.15 to 0.6 mm. and water injection means intermediate between sol injection means and the dehydrating solvent inlet at the bottom of the column.

Actinide metal oxides have become of paramount importance in the field of nuclear fuels. Current reactor designs, especially the design of the high temperature gas-cooled reactors, have placed very demanding requirements on the fuel employed. The fuel must be resistant to oxidation and fission product release. The fuel must be near theoretical density to provide the requisite efficiency. The fuel elements are usually formed by dispersing the fuel material in a ceramic matrix which is then pressed or compacted into the desired shape under high pressures, and the fuel material must be sufficiently strong to withstand the severe stresses present during compaction. Use of the fuel materials, actinide oxides and carbides, in the form of spherical particles met these stringent requirements.

A process for producting microspheres from sol particles has been discolsed wherein the sol was dispersed in the form of small droplets in a dehydrating liquid. The spherical droplet shape resulting from surface tension effects was retained during drying of the microspheres. However, serious difficulties were encountered with the system. The process conditions required highly precise control in order to provide uniformity in size. Furthermore, even when the required difficult degree of control was obtained, a proportion of the microspheres produced were found to have surface irregularities such as pits, cavities, and cracks. The proportion of defective spheres greatly increased when adequate control of the process was not achieved.

It is an object of this invention to produce microspheres of metal oxides sols having a high degree of regularity in shape, being free of internal defects, and having highly uniform surface characteristics.

It is another object of this invention to produce microspheres of metal oxide sols having a high degree of uniformity of shape and surface characteristics and being free of internal defects by a method allowing the use of a wider range of process conditions.

It is still another object of this invention to produce microspheres from metal oxide sols by the dehydration of sol droplets in a solvent wherein the metal oxide sols have been pretreated with hydrogen peroxide.

It is still another object of this invention to produce microspheres from metal oxide sols by the dehydration of sol droplets in a column containing a dehydrating solvent wherein water is locally introduced into the dehydrating solvent prior to contact thereof with the metal oxide sol droplets.

Further objects and aspects of this invention are set forth in the drawing and specification which follows.

In the drawing:
The figure is a sectional view of an extraction column containing water introduction means.

The microspheres can be prepared in the improved process of this invention from various colloidal materials that sinter to suitable ceramics, for example, the colloids of alumina, zirconia, beryllia, silica, magnesia, chromia, the refractory oxides of metals in Group IV of the Periodic Table, transition element oxides, actinide oxides, rare earth oxides, and their mixtures. Our experience with a wide range of materials indicates that microspheres can be obtained by our process from sols of all stable oxides or their mixtures which are capable of forming stable high temperature dense bodies, e.g., ceramics. The oxides of metals in Group IV which are of interest include titania, zirconia, hafnia, etc. The transition element oxides which are suitable include ferric oxide, cobalt oxide, nickel oxide, etc.

One specific application of these materials is found in the field of nuclear fuel development. Particular materials suitable for nuclear development include actinide oxides, mixtures of these oxides, solid solution systems of actinide oxides with rare earth oxides, with zirconium oxides, with beryllium oxides, etc. The antinide metals include the elements in the actinide series in the periodic table, thorium, uranium, neptunium, plutonium, americium, etc.

The elements properly included in the group designated the "rare earths" is the basis of some controversy. We include element No. 39, yttrium, with the members of the lanthanide series, beginning with element No. 58 through element No. 71 of the periodic table. Thus we include cerium, praesodymium, neodymium, promethium, samarium, europium, gadolinium, terbium, dysprosium, holmium, erbium, etc., with yttrium in our definition of the rare earth oxides.

The sols used in the preparation of the particles by our process are well known. One suitable method of preparing thoria sols is covered in U.S. Patent No. 3,097,175. A description of mixed thoria-urania sols and one suitable method of preparing these sols is described in U.S. Patent 3,091,592. Other sols of $UO_2$, $ZrO_2$, $Y_2O_3$, and their combinations, suitable for the process are well known in the art.

The solvent dehydration may be obtained by the following procedures:

(a) Dispersing sol droplets into a stirred boiling solvent system with continuous recovery of dried product spheres on settling from the system; and (b) Drying sol droplets by settling into a column of hot counter-flow solvent and continuously removing the dried spheres from the column bottom.

Each of these methods, although quite different in equipment design, are essentially only modifications of the drying process and are discussed in detail below. To avoid confusion, each of the systems is discussed separately below.

DRYING IN A STIRRED BOILING REACTOR

In this system sol droplets of controlled size, generally within the range of 0.1 to 1.0 millimeters in diameter, and a concentration of 1 to 40 weight percent solids are dispersed into a boiling, uniformly stirred water-immiscible solvent with a density of greater than one. The solvent is strongly heated to remove water continuously as a water-solvent distillate at rates equivalent to the addition of water to the mixture as sol. The distillate solvent, after water separation, is continuously returned to the boiling solvent pot. The droplets on drying to microspheres settle to the bottom and collect due to their greater density. These spheres are removed, preferably continuously from this point, separated from the solvent, and dried before being sintered to a high density. The sols are injected into the solvent in this system, and on injection into the boiling immiscible solvent the sol droplets dry to microspheres within 10 to 45 seconds. Most of this drying period is at the lower sol concentrations where the bulk of the water is removed. The droplets tend to rise at these low concentrations when their density is less than that of the solvent and to sink during the much shorter period at high concentrations and increased density just prior to drying. Solvent densities of greater than 1 are required to provide sufficient buoyancy during drying to maintain droplet dispersion. Reactor dimensions should be such as to allow sufficient settling distance for the spheres to dry before wall contact. On settling, the microspheres collect on the bottom in the vortex of the stirred solvent. Their continuous removal from this point, separation from the solvent stream and recycle of the solvent is both convenient and desirable in the larger reactors.

A feature of this process is the selection of the solvent or solvent mixture which have a suitable density, boiling point, and low solubility for water (generally 1 weight percent or less) under these strong dehydrating conditions. The density should be sufficiently above 1 to provide the requisite buoyancy during most of the drying period in order to maintain dispersion and also to prevent collection and coalescence of the droplets on the bottom or sides of the vessel. The precise requirement in this regard is determined by the equipment dimensions and other practical considerations. A hot solvent density of 1.1 to 1.3 has been generally preferred with equipment having the dimensions of the apparatus used in the examples. Solvent mixtures that provide effective distillation rates are required. Operating temperatures ranging from 70° C. to 160° C. have been used, but a range of 120–155° C. is generally preferred. Chlorinated solvents generally are the main constituents of the solvent mixture due to their density, availability, cost considerations, and their low acceptable solubility for water. However, a number of fluorinated and brominated solvents also meet these requirements. In particular, di- and trichlorobenzene, carbon tetrachloride and tri, tetra, and pentachloroethane are useful solvent constituents in obtaining suitable density and volatility. For example, mixtures of 15 to 25 volume percent monochlorobenzene and 85 to 75 volume percent dischlorobenzene or of 50 volume percent tetrachloroethane and 50 volume percent dichlorobenzene have been useful solvent mixtures. These solvent mixtures were generally improved by the addition of a small quantity of alcohol such as for example 5 to 10 volume percent butanol.

The applicable sol concentrations are governed principally by practical consideration, droplet size and the desired product microsphere size. Concentrations of 1 to 35 percent $UO_2$, for example, have been used in obtaining spheres of from 25 to 250 microns in diameter. Mixtures of sols may be used to obtain oxide solid solution phases on sintering. Thus, the use of mixtures of sols in suitable proportions yields a microsphere with the colloidal oxides in intimate contact which will sinter readily to a dense oxide solid solution phase.

Sol injection has been accomplished with submerged needles or related devices which provide uniformly sized droplets. Flows of 5 to 12 cc. sol per minute have been realized, providing a capacity of 20 to 100 g. of microspheres per hour per injection device. The process is capable of being scaled-up with multiple sol injection devices to appreciable capacity with little change in the process steps. The sol can also be introduced as an emulsion wherein the sol droplets are formed prior to the introduction thereof into the pot.

On removal from the solvent, the microspheres can be dried using any of the conventional techniques, such as heating in an inert gas stream, vacuum drying, etc. After the preliminary drying treatment, the microspheres may be sintered to high density.

While operation at atmospheric pressure generally is intended for practical reasons, it is recognized that other pressures could be employed without altering the essential features of the process. We thus intend to include operation at pressures of from about 0.1 to 10 atmospheres.

We have discovered that the stirred Boiling Reactor Process can be improved by pretreating the metal oxide sol with hydrogen peroxide prior to the injection thereof into the dehydrating solvent system.

In this improved method, the metal oxide sol is mixed with amounts of hydrogen peroxide sufficient to provide a concentration of from about 2 to 20 mole percent and preferably from about 8 to 12 mole percent based on the moles of metal oxide in the sol. The hydrogen peroxide treated sol can be introduced directly into the reactor. However, the hydrogen peroxide treated sol is preferably heated to a temperature of from about 40 to 70° C. and preferably from about 50 to 60° C. in order to decompose any residual unreacted hydrogen peroxide remaining in the sol in order to avoid the possibility of reaction between the peroxide and the organic dehydrating solvent employed in the reactor. The hydrogen peroxide can also be added to the sol which has been preheated to from about 40 to 70° C., but extreme agitation is necessary to prevent local, non-uniform treatment of the sol. When the heating step is employed, the sol is preferably cooled to a temperature within the range of from 20 to 35° C. before introduction into the reactor.

Although the mechanism of this pretreatment is not known, it has been found that the microspheres produced from hydrogen peroxide pretreated sols have fewer surface defects, even when the process conditions are not as precisely controlled.

SPHERE FORMATION IN HOT SOLVENT COLUMN

Spherical materials can also be made using a hot solvent column system. In this system, sol droplets can be continuously dried to spheres by allowing the droplets to settle through a long column of hot solvent of controlled temperature and water content. The spheres are collected in the bottom cone of the column and are continuously removed, separated from the solvent, and dried before sintering to high density.

The hot solvent column of this invention is shown in FIGURE 1. The apparatus comprises a column 10 with a conical bottom 12 to collect the settling spheres. Hot solvent is pumped into the column through solvent inlet 14 in the bottom of the column. The solvent is removed from the column through solvent outlet 16 at the top and is passed to a water removal system such as a distillation pot.

The sol is injected into the top of the column through sol inlet tube 18. The sol inlet tube inner diameter must be within the range of 0.15 to 0.6 mm. in order to produce the required particles. An optimum inner diameter of from about 0.2 to 0.5 mm. provides a sol flow rate suitable for producing the desired droplet size. Hypodermic needles have been found to be suitable as sol inlet tubes. The sol droplets can be preformed as an emulsion, and the emulsion can be introduced into the column through an injection tube.

The droplets dry while settling and are collected in the bottom of the column. They are withdrawn from the cone 12 through microsphere outlet 20. The column sections can be sealingly united by means of bolts 24 and gaskets 22.

A critical feature in this apparatus is the use of a water introduction means 26 having a water outlet 28 located so as to introduce water into the column below the sol injection means 18 and above the solvent inlet means 14. The water is introduced into the column as a fine spray in an area of the column through which the sol droplets pass. Such a spray is conveniently formed by forcing water through a hypodermic needle under pressure, for example. The water spray can be introduced at any point in the column, depending upon the conditions present therein. Some vertical adjustment of the spray may be necessary in order to obtain both adequate drying and high degree of dried particle regularity. Similarly, the amount of water introduced will depend upon the particular sol being dehydrated, the particular dehydrating solvent employed, the column temperature, and the column dimensions. In general the water is injected into the column in a quantity sufficient to substantially lower the solubility of the dehydrating solvent for water, whereby a solubility gradient in the column is established, but insufficient to saturate the dehydrating solvent at the level in the column where it is introduced.

Use of this water injection means has produced a more highly uniform and perfect surfaced sol particle and has made efficient operation of the apparatus less sensitive to process conditions. The water introduced by this technique effects a higher yield of perfect spheres.

The solvent can be reconditioned by circulation in a counter current direction to a distillation pot for water removal. The distillation pot serves as a solvent reservoir for the system and can be controlled by adjusting water removal and distillation temperature to provide solvent to the desired water content. A solvent cooler can be placed on the input line for adjustment of the solvent temperature to the desired value. This process has the advantage of providing a wide range of drying conditions.

One embodiment of the equipment useful for the process comprises a column 7 feet in length and 3 inches in diameter with a conical bottom to collect the settling spheres. The solvent is pumped through a cooler to adjust the temperature at a flow rate of ½ to 2 liters per minute into the column four inches from the bottom of the column. The solvent is removed from the column at a point four inches from the top and is passed through flow meters to a distillation pot.

Choice of the solvents for this system is very important. The solvents giving the best results are the higher alcohols which have the desired solubility for water. The solvents must be inert, free of objectionable physical properties, such as emulsifying tendencies for example, and must have a density low enough to permit settling. The preferred density is below one. The solvents selected must have saturation concentrations with water within a certain range permitting adjustment of drying conditions. Solubilities for water from about 1 to 30 percent have given satisfactory results. A water solubility of 3 to 12 percent is preferred for drying a majority of sols in this system. Examples of preferred solvents include hexanol, ethyl hexanol, and ethyl butanol. Solvents with water solubilities which are too high may be recirculated from the distillation pot still retaining a predetermining amount of water whereby their effective water solubility is diminished. For example, butanol, which has a hot solubility for water of about 28 weight percent, is nearly saturated with water when introduced into the column. In contrast, ethyl hexanol with a 4 to 6 weight percent hot solubility for water is circulated to the column in a nearly anhydrous form. Hexanol, with a 10 to 11 weight percent solubility for water is used with a water content of 3 to 6 percent.

The pretreatment of the sol with hydrogen peroxide in the Hot Column Process is identical to that described with respect to the stirred Boiling Reactor Process and produces similarly improved results. This pretreatment is greatly beneficial when used without the water addition to the column, and is also highly beneficial when employed in conjunction with the water addition previously described.

The sol concentrations and amounts of hydrogen peroxide added to the sol are similar to those covered in the description of the previous reactor process. The droplet drying and sintering conditions are also very similar to those discussed previously.

Our invention is further illustrated by the following specific but non-limiting examples.

*Example I*

This example demonstrates the beneficial effect of a water spray in a seven foot column reactor containing butanol. Solvent flow was countercurrent with a solvent entering the bottom of the column at a rate of 700 ml. per min. of this flow, 550 ml. per min. was pumped from the distillation pot while 150 ml. per min. was recycled back to the column directly. The temperature of the entering solvent was 90° C. and corresponded to a water content of 12 weight percent. The solvent at the top of the column was subjected to a fine spray of water, 14 ml. per min. ejected under pressure from a 24 gauge hypodermic syringe needle.

The feed material was a $UO_2$ sol containing 16 weight percent $UO_2$. It was injected at the rate of 2 ml. per min. from a sol injection tube consisting of a 24 gauge hypodermic needle. Droplets formed upon break-up of the jet stream. The water spray was directed downward from a point approximately 4 inches below the tip of the sol injection tube. The droplets were mechanically undisturbed as they moved downward through the water spray toward a collection point at the bottom from which dry microspheres were recovered. The product when examined under a microscope was found to consist of gray-black spheres ranging from 150 to 350 microns. Surfaces were rough, but the spheres were not cavitated or fractured.

The run was now repeated without the water spray. In addition to some perfect spheres, this product contained many split spheres. The split spheres, moreover, contained indentations which indicated their origin from hollow or cavitated spheres. Such microspheres obviously lack strength and have low particle densities. The use of the water spray is therefore seen to produce a superior product.

*Example II*

The purpose of this run was to repeat the experiment of Example I, but with hexanol rather than with butanol as solvent. The spray needle was positioned 15 inches below the tip of the sol injection tube. Air pressure was adjusted to deliver 13 ml. per min. of water as a fine spray. The feed material was a $UO_2$ sol containing 35 weight percent $UO_2$. This was injected into the solvent at a rate of 2 ml. per min.

The flow rate of hexanol into the bottom of the column was 1150 ml. per min. The temperature of the inlet solvent was 102° C., and of the exit solvent was 76° C. The water content of the inlet solvent was 1.0 weight percent. Perfect gray-black microspheres ranging from 250 to 350 microns were recovered from the bottom of the column after sol droplets have been injected into the solvent.

Next the experiment was repeated without the water spray. Instead the water content of the inlet solvent was increased to 2.1 weight percent. Nonetheless, the product microspheres were badly cavitated and fractured.

Example III

This example likewise demonstrates the use of the water spray to make defect free microspheres in hexanol. The feed material in this case, however, was a binary sol mixture of urania and zirconia containing 15 weight percent total oxide. It was injected into the hexanol at a rate of 2 ml. per min.

Solvent flow rate through the column was 670 ml. per min. The inlet temperature was 100° C. and the outlet temperature, 70° C. The spray needle was positioned 27 in. below the tip of the sol injection tube. It supplied a fine spray of water at a rate of 13 ml. per min. Perfect gray-black microspheres, mostly 200–250 microns in diameter, were obtained as product under the conditions just described.

The experiment was now repeated without the water spray. The sol was put through the column in the same way as before, but the product microspheres were frequently cavitated and fractured.

Example IV

This example demonstrates the beneficial effect of hydrogen peroxide addition to the feed material. A 30.3 percent hydrogen peroxide solution was added with stirring to a $UO_2$ sol in an amount equivalent to 10 mole percent $UO_2$. The sol concentration level was 15.0 weight percent $UO_2$. Heat was applied until the system reached 60° C. in order to decompose any residual, unreacted peroxides. The sol was then cooled to about 30° C.

The column reactor described in the preceding examples was filled with hexanol and brought to equilibrium with a flow rate of 680 ml. per min. and a temperature of 102° C. at the bottom and 80° C. at the top. Excellent operation was established by placing the spray needle 28 in. below the tip of the feed injection needle and forcing water through it at the rate of 13 ml. per min. The water content of the inlet solvent was about 1.0 weight percent.

First a sample of $UO_2$ sol not treated with hydrogen peroxide was injected at a rate of 2 ml. per min. The product spheres recovered from the bottom of the column showed many blow-holes and fractures. Next, a sample of the hydrogen peroxide-treated sol was put through under identical conditions. There was a sharp reduction in the number of defective microspheres.

Example V

To demonstrate still further the beneficial effect of hydrogen peroxide, the experiment of Example 3 was repeated with a water spray of only 8 ml./min. All other conditions and the feed materials were precisely as described in Example 4.

Without hydrogen peroxide, a large number of severely fractured black spheres were obtained. Many of the unbroken spheres, moreover, were pear-shaped. With hydrogen peroxide in the feed, perfect spheres with very little fracture resulted despite the lower water injection rate employed.

Example VI

Hydrogen peroxide has also been used to produce good microspheres from $UO_3$—$ZrO_2$ sol mixtures. Without it, results were very poor. The peroxide containing charge was prepared by adding 1.25 ml. of 30.3 percent hydrogen peroxide solution to 236 ml. of a uranium trioxide-zirconia sol mixture containing 6.1 g. total oxide per 100 ml. The mixture was heated to 60° C. with stirring and then cooled. As a control a similar $UO_3$—$ZrO_2$ sol mixture was prepared without the hydrogen peroxide.

The column reactor was filled with hexanol and brought to equilibrium at a solvent flow rate of 2100 ml. per min. About 1250 ml. per min. were recycled directly back to the column. The inlet temperature to the column was 101° C. while the outlet temperature was 88° C. The water content of the inlet solvent was 3.75 weight percent.

The two feed materials were separately injected into the solvent at a rate of 2.5 ml. per min. Perfect yellow microspheres free of cavities and ranging chiefly from 125 to 250 microns in diameter, were recovered from the bottom of the reactor when the hydrogen peroxide treated sol was employed. The microspheres produced from the control sol were within the same size range, but were severely cavitated and fractured.

From these examples it can be seen that the use of a water spray in the column effects perfect microsphere production at column conditions which would otherwise be inoperable to obtain the desired product quality. It can furthermore be seen that the pretreatment of the sol with hydrogen peroxide introduces a similar flexibility in suitable column conditions and produces a superior product. The combination of these operations also provides an improved process.

We claim:

1. A process for preparing highly regular spherical oxide particles having diameter in the range of 5 to 500 microns comprising the steps of:
   (a) treating an oxide aquasol with from about 2 to 20 mole percent hydrogen peroxide based on the moles of metal oxide in the sol,
   (b) introducing the treated oxide aquasol into the top of a column of counterflowing dehydrating solvent in the form of droplets,
   (c) introducing water into the column in a quantity sufficient to substantially lower the solubility for water of the dehydrating solvent, whereby a solubility gradient in the column is established, and insufficient to saturate the dehydrating solvent at the level in the column where it is introduced, the water being introduced at a point intermediate the top and bottom of the column and in the path of the falling oxide spheroids, and
   (d) removing the spherical particles formed from the bottom of the column.

2. A process for preparing highly regular spherical oxide particles comprising the steps of:
   (a) treating a metal oxide aquasol with from about 2 to 20 mole percent hydrogen peroxide based on the moles of metal oxide in the sol,
   (b) introducing the treated oxide aquasol in a dehydrating solvent in the form of droplets whereby the water is extracted from the aquasol spheroids in the solvent, and
   (c) removing the highly regular spherical oxide particles formed thereby from the dehydrating solvent.

3. In the process of preparing highly regular spherical metal oxide particles having diameters in the range of 5 to 500 microns comprising introducing the treated oxide aquasol into the top of a column of counterflowing dehydrating solvent in the form of droplets, allowing the aquasol droplets to fall through the column, and removing the dehydrated spherical particles formed from the bottom of the column, the improvement comprising mixing the metal oxide aquasol with from about 2 to 20 mole percent hydrogen peroxide based on the moles of metal oxide in the sol prior to introducing the aquasol into the top of the column.

4. The process according to claim 3 wherein the aquasol is heated to from 40 to 70° C. after being mixed with the peroxide.

5. In the process of preparing highly regular spherical metal oxide particles having diameters in the range of from about 5 to 500 microns comprising the steps of introducing the treated oxide aquasol into the top of a column of counterflowing dehydrating solvent in the form of droplets, allowing the aquasol droplets to fall through the column, and collecting the dehydrated spherical particles from the bottom of the column, the improvement comprising the injection of water into the column intermediate the top and bottom thereof in the path of the falling aquasol droplets in a quantity sufficient to substantially lower the solubility for water of the dehydrating solvent, whereby a solubility gradient in the column is established, and insufficient to saturate the dehydrating solvent at the level in the column where it is introduced.

References Cited by the Examiner

UNITED STATES PATENTS 2,467,089  4/1949  Marisic et al. _____ 252—317 X

OTHER REFERENCES

AEC Document, TID–11494, 1961, pp. 23–25.

CARL D. QUARFORTH, *Primary Examiner.*

BENJAMIN R. PADGETT, *Examiner.*

S. TRAUB, *Assistant Examiner.*